(12) United States Patent
McElroy

(10) Patent No.: US 6,251,534 B1
(45) Date of Patent: Jun. 26, 2001

(54) FUEL CELL CASCADE FLOW SYSTEM

(75) Inventor: James F. McElroy, Suffield, CT (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/401,766

(22) Filed: Sep. 23, 1999

(51) Int. Cl.[7] ............................. H01M 8/00; H01M 2/00
(52) U.S. Cl. ................... 429/13; 429/12; 429/34; 429/38; 429/39; 429/17; 429/22; 429/18
(58) Field of Search ................. 429/12, 13, 34, 429/17, 22, 38, 39, 18

(56) References Cited

U.S. PATENT DOCUMENTS

| | | |
|---|---|---|
| 4,537,839 | 8/1985 | Cameron . |
| 4,766,044 | 8/1988 | Sederquist . |
| 4,988,583 | 1/1991 | Watkins et al. . |
| 5,260,143 | 11/1993 | Voss et al. . |
| 5,382,478 | 1/1995 | Chow et al. . |
| 5,547,776 | 8/1996 | Fletcher et al. . |
| 6,007,931 | 12/1999 | Fuller et al. . |
| 6,013,385 | 1/2000 | DuBose . |

*Primary Examiner*—Carol Chaney
*Assistant Examiner*—Angela J. Martin
(74) *Attorney, Agent, or Firm*—Fish & Richardson P.C.

(57) ABSTRACT

The invention relates to a fuel cell cascade flow system. The system is designed so that under certain conditions the system includes two fuel cell stacks that form a fuel cell cascade, and under other conditions at least one reactant gas flows in parallel through the two fuel cell stacks.

26 Claims, 6 Drawing Sheets

FUEL CELL CASCADE FLOW SYSTEM

The invention relates to a fuel cell cascade flow system.

BACKGROUND OF THE INVENTION

A fuel cell can convert chemical energy to electrical energy by promoting a chemical reaction between two reactant gases.

One type of fuel cell includes a cathode flow field plate, an anode flow field plate, a membrane electrode assembly disposed between the cathode flow field plate and the anode flow field plate, and gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each reactant flow field plate has an inlet region, an outlet region and open-faced channels connecting the inlet region to the outlet region and providing a way for distributing the reactant gases to the membrane electrode assembly.

The membrane electrode assembly usually includes a solid electrolyte (e.g., a proton exchange membrane) between a first catalyst and a second catalyst. One gas diffusion layer is between the first catalyst and the anode flow field plate, and another gas diffusion layer is between the second catalyst and the cathode flow field plate.

During operation of the fuel cell, one of the reactant gases (the anode reactant gas) enters the anode flow field plate at the inlet region of the anode flow field plate and flows through the channels of the anode flow field plate toward the outlet region of the anode flow field plate. The other reactant gas (the cathode reactant gas) enters the cathode flow field plate at the inlet region of the cathode flow field plate and flows through the channels of the cathode flow field plate toward the cathode flow field plate outlet region.

As the anode reactant gas flows through the channels of the anode flow field plate, some of the anode reactant gas passes through the anode gas diffusion layer and interacts with the anode catalyst. Similarly, as the cathode reactant gas flows through the channels of the cathode flow field plate, some of the cathode reactant gas passes through the cathode gas diffusion layer and interacts with the cathode catalyst.

The anode catalyst interacts with the anode reactant gas to catalyze the conversion of the anode reactant gas to reaction intermediates. The reaction intermediates include ions and electrons. The cathode catalyst interacts with the cathode reactant gas and the reaction intermediates to catalyze the conversion of the cathode reactant gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and reactant gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Because electrons are formed at the anode side of the membrane electrode assembly, that means the anode reactant gas undergoes oxidation during the fuel cell reaction. Because electrons are consumed at the cathode side of the membrane electrode assembly, that means the cathode reactant gas undergoes reduction during the fuel cell reaction.

For example, when molecular hydrogen and molecular oxygen are the reactant gases used in a fuel cell, the molecular hydrogen flows through the anode flow field plate and undergoes oxidation. The molecular oxygen flows through the cathode flow field plate and undergoes reduction. The specific reactions that occur in the fuel cell are represented in equations 1–3.

$$H_2 \rightarrow 2H^+ + 2e^- \qquad (1)$$

$$\tfrac{1}{2}O_2 + 2H^+ + 2e^- \rightarrow H_2O \qquad (2)$$

$$H_2 + \tfrac{1}{2}O_2 \rightarrow H_2O \qquad (3)$$

As shown in equation 1, the molecular hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the molecular oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. Typically, in a fuel cell stack, one side of a flow field plate functions as the anode flow field plate for one fuel cell while the opposite side of the flow field plate functions as the cathode flow field plate in another fuel cell. This arrangement of anode/cathode flow field plates is repeated to provide the reactant flow field plates of the fuel cell stack. The fuel cell stack can further include coolant flow field plates interspersed between the anode and cathode flow field plates.

Multiple fuel cell stacks can be arranged in a system so that, as the reactant gases flow through the system, the cathode gas output stream and/or the anode gas output stream of one fuel cell stack serve as the cathode gas input stream and/or the anode gas input stream, respectively, of the next fuel cell (i.e., series flow). Such a system is commonly referred to as a fuel cell cascade.

SUMMARY OF THE INVENTION

The invention relates to a fuel cell cascade flow system.

The system is designed so that at a low system power output the system includes two fuel cell stacks that form a fuel cell cascade, and at a high system power output at least one of the reactant gases flows through the two fuel cell stacks in parallel. With this design, there is a small difference between the pressure drop across the two fuel cells at low system power output and the pressure drop across the system at high system power output relative to an otherwise substantially identical system in which the two fuel cells form a fuel cell cascade at both low and high system power output.

When a high system power output is desired, the flow of reactant gas through the two fuel cell stacks can be in parallel so that a high reactant gas flow rate can be used while maintaining a pressure drop across the system that is small enough to use a low power device (e.g., a blower), rather than a high power device (e.g., a compressor), to flow reactant gas through the system. When a low system power output is desired, the two fuel cell stacks can be arranged to form a fuel cell cascade so that a low reactant gas flow rate can be used while maintaining a pressure drop across the system that is small enough to use a low power device to flow the reactant gas through the system but large enough to reduce blocking of the flow field plate channels due to liquid water build up relative to prior art systems.

The amount of reactant gas that is wasted at low system power output can be reduced relative to prior art systems. The minimum stable system power output level can be reduced relative to prior art systems.

In general, one aspect of the invention is a system which includes a first fuel cell stack, a second fuel cell stack, a conduit that accepts a reactant gas into the system, and a valve. The first fuel cell stack has an inlet and an outlet, and the second fuel cell stack has first, second and third ports. The first fuel cell stack outlet is connected to the third port of the second fuel cell stack along a first flow path. The conduit has an outlet connected to the first fuel cell stack inlet along a second flow path different than the first flow path. The valve is between the conduit outlet and the first port of the second fuel cell stack along a third flow path different than the first and second flow paths. When the valve is open the conduit outlet is connected to the first port of the second fuel cell stack along the third flow path, and when the valve is closed the conduit outlet is not connected to the first port of the second fuel cell stack along the third flow path.

The system can further include second and third valves. The second valve is connected to the first port of the second fuel cell stack along a fourth flow path different than the first, second and third flow paths, and the third valve is connected to the second port of the second fuel cell stack along a fifth flow path different than the first, second, third and fourth flow paths. In addition, the system can also include a controller that, during operation, sets the positions of the valves (i.e., open or closed). The controller sets the position of the first and third valves to be the same, and the controller sets the position of the second valve to be the opposite of the position of the first valve.

The system can be designed so that the first port of the second fuel cell stack is an inlet port when the first valve is open and the first port of the second fuel cell stack is an outlet port when the first valve is closed.

The first fuel cell stack can include a plurality of fuel cells, each fuel cell having a cathode fluid flow plate, an anode fluid flow plate and a solid electrolyte between the cathode and anode fluid flow plates. The second fuel cell stack can include a plurality of fuel cells, each fuel cell of the second fuel cell stack having a cathode fluid flow plate, an anode fluid flow plate and a solid electrolyte between the cathode and anode fluid flow plates. The anode flow field plate of each fuel cell in the first fuel cell stack can have a flow path that connects the inlet of the first fuel cell stack to the outlet of the first fuel cell stack, and the anode flow field plate of each fuel cell in the second fuel cell stack can have a flow path that connects the first port of the second fuel cell stack to the second port of the second fuel cell stack. The cathode flow field plate of each fuel cell in the first fuel cell stack can have a flow path that connects the inlet of the first fuel cell stack to the outlet of the first fuel cell stack, and the cathode flow field plate of each fuel cell in the second fuel cell stack can have a flow path that connects the first port of the second fuel cell stack to the second port of the second fuel cell stack.

In some embodiments, the first fuel cell stack can be physically separated from the second fuel cell stack.

In certain embodiments, the system can include more than two fuel cells stacks that can operate as a fuel cell cascade under certain conditions, and have reactant gas flow in parallel under other conditions.

In some embodiments, the ratio of the number of fuel cells in the first fuel cell stack to the number of fuel cells in the second fuel cell stack is at least about 2 to 1.

In general, another aspect of the invention is a system which includes a first fuel cell stack, a second fuel cell stack, a conduit that accepts a reactant gas into the system, and a switching apparatus having an inlet and an outlet. The first fuel cell stack has an inlet and an outlet, and the second fuel cell stack has first, second and third ports. The first fuel cell stack outlet is connected to the third port of the second fuel cell stack along a first flow path. The conduit has an outlet connected to the first fuel cell stack inlet along a second flow path different than the first flow path. During operation, the switching apparatus controls a flow path of the reactant gas through the system. During operation, when the switching apparatus is in a first position the reactant gas flows from the conduit outlet to the first port of the second fuel cell stack, and when the switching apparatus is in a second position the reactant gas is blocked from flowing from the conduit outlet to the first port of the second fuel cell stack.

In general, a further aspect of the invention is a method of operating a system which has first and second fuel cell stacks. The method includes selecting a first reactant gas flow path through the first and second fuel cell stacks from the group consisting of a first flow path through the first and second cell stacks and a second flow path through the first and second cell stacks. The first flow path is different than the second flow path. The first flow path is selected under a first set of operating conditions, and the second flow path is selected under different set of operating conditions. The method also includes flowing a first reactant gas through the first and second fuel cell stacks along the first reactant gas flow path, and flowing a different reactant gas through the first and second fuel cell stacks along a second reactant gas flow path that is different than the first reactant gas flow path. In addition, the method includes reacting the first and second reactant gases in the first and second fuel cell stacks.

The first reactant gas can be a fuel gas, or the first reactant gas can be an oxidant gas.

The first reactant gas can flow through the first and second fuel stacks along a flow path which connects an output of the first fuel cell stack to an input of the second fuel cell stack.

The method can further include selecting the second reactant gas flow path through the first and second fuel cell stacks from the group consisting of a third flow path through the first and second cell stacks and a fourth flow path through the first and second cell stacks. The third flow path is different than the first and second flow paths, and the fourth flow path is different than the first, second and third flow paths. The third flow path is selected under the first set of operating conditions, and the fourth flow path is selected under the second set of operating conditions.

Other features and advantages of the invention will be apparent from the detailed description and the drawings.

DETAILED DESCRIPTION

Figure 1:
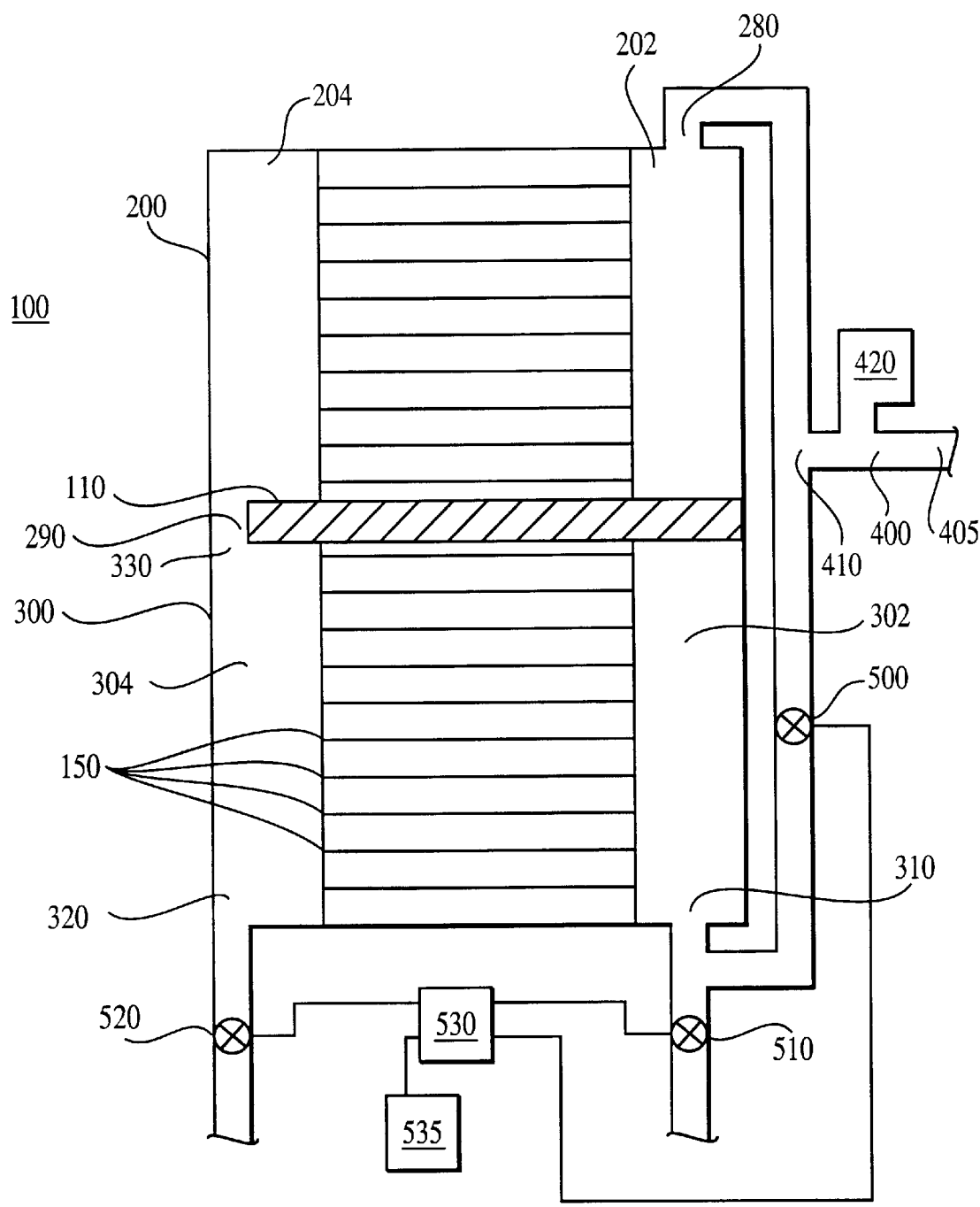
FIG. 1 is a schematic representation of one embodiment of a fuel cell cascade flow system according to the invention.
Figure 2:
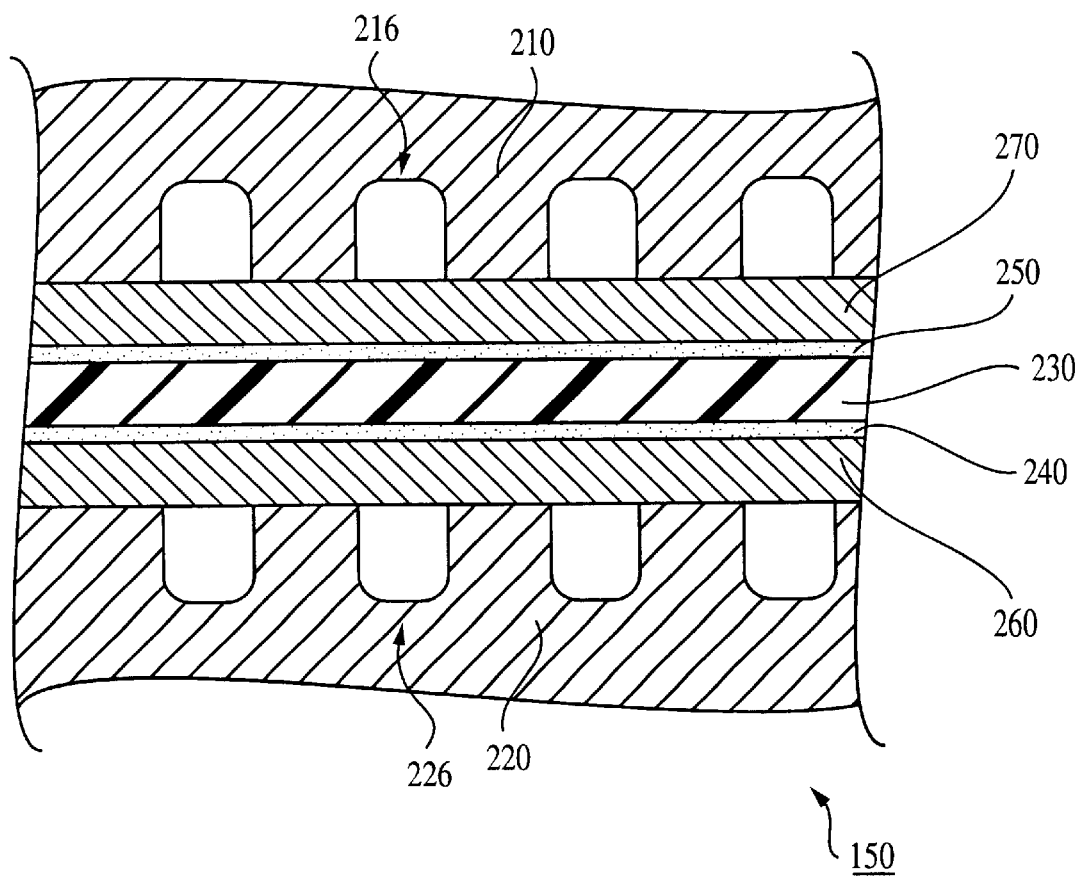
FIG. 2 is a cross-sectional view of an embodiment of a fuel cell.
Figure 3:
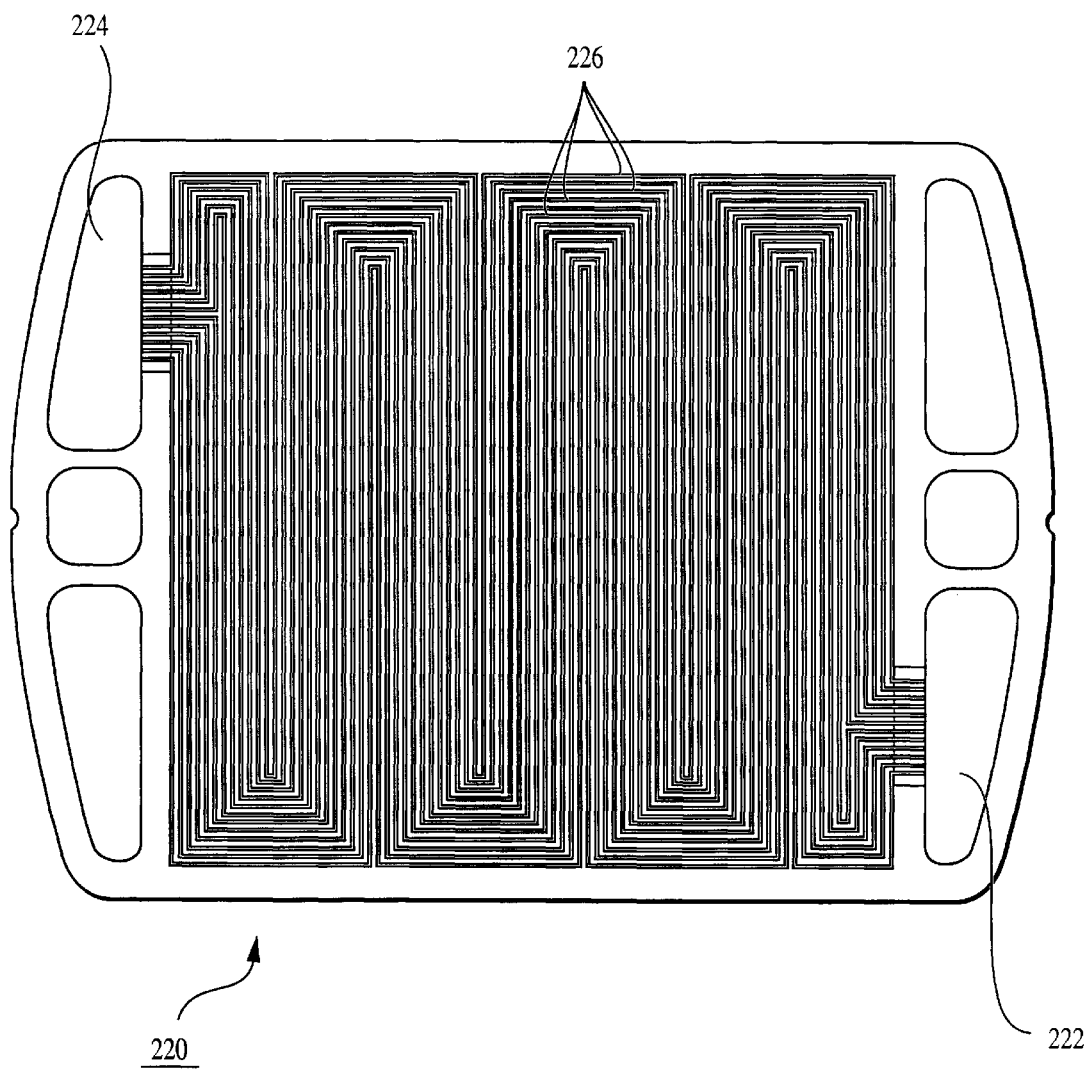
FIG. 3 is an elevational view of an embodiment of an anode flow field plate.
Figure 4:
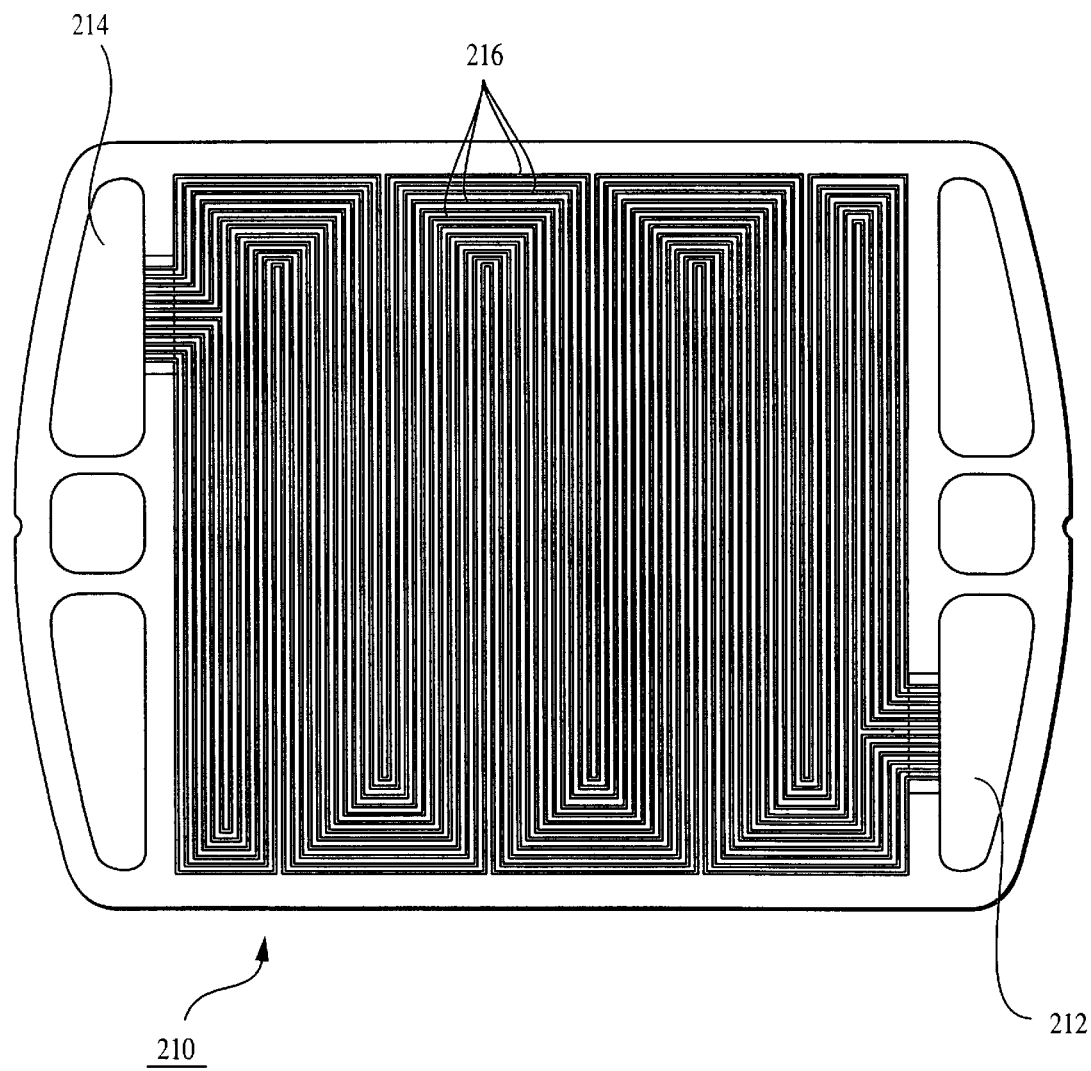
FIG. 4 is an elevational view of an embodiment of a cathode flow field plate.

FIG. 1 shows an embodiment of the invention in which a fuel cell stack system 100 includes a fuel cell stack 200 having an inlet 280 and an outlet 290; a fuel cell stack 300 having ports 310, 320 and 330; a partition 110 separating fuel cell stacks 200 and 300; a conduit 400 having an inlet 405 and an outlet 410; a blower 420 to flow reactant gas through system 100; valves 500, 510 and 520; a controller 530 which is in electrical communication with valves 500, 510 and 520, and a sensor 535 which is in electrical communication with controller 530 and which senses the desired power output of system 100. Fuel cell stacks 200 and 300 each include a plurality of fuel cells 150. As shown in FIGS. 2 and 3, each fuel cell 150 includes an anode flow field plate 220 having a first port 222, a second port 224 and open-faced channels 226 that provide a flow path between ports 222 and 224. Similarly, as shown in FIGS. 2 and 4, each fuel cell 150 includes a cathode flow field plate 210 having a first port 212, a second port 214 and open-faced channels 216 that provide a flow path between ports 212 and 214.

For each fuel cell 150 contained in fuel cell stack 200, port 222 is connected to inlet 280 along a manifold 202 which provides a flow path between port 222 and inlet 280, and port 224 is connected to outlet 290 along a manifold 204 which provides a flow path between port 224 and outlet 290. With this arrangement, a fuel gas flows from conduit outlet 410 to inlet 280 of fuel cell stack 200. From inlet 280, the fuel gas flows along manifold 202 to ports 222 of fuel cells 150 contained in fuel cell stack 200 and then along channels 226 to ports 224. From ports 224, the fuel gas flows along manifold 204 to outlet 290 of fuel cell stack 200.

For each fuel cell 150 contained in fuel cell stack 300, port 310 is connected to port 222 along a manifold 302 which provides a flow path from port 310 to port 222, port 224 is connected to port 320 along a manifold 304 which provides a flow path from port 224 to port 320, and port 224 is connected to port 330 along a flow path. The flow of fuel gas through fuel cell stack 300 is controlled by valves 500, 510 and 520 which, in turn, are controlled by the desired power output of system 100.

When sensor 535 detects that a relatively low power output is desired from system 100, sensor 535 sends a signal to controller 530 to close valves 500 and 520, and open valve 510. In this operational state, the fuel gas only enters fuel cell 300 by passing from outlet 290 to port 330 of fuel cell stack 300. From port 330, the fuel gas flows along manifold 304 to ports 224 of fuel cells 150 contained in fuel cell stack 300 and then along channels 226 to ports 222. From channels 226, the fuel gas flows along manifold 302 and exits system 100 via port 310. Thus, in this operational state, fuel cell stacks 200 and 300 are arranged in a fuel cell cascade (i.e., the fuel gas flows through fuel cell stacks 200 and 300 in series), and the fuel gas pressure drop between inlet 280 of fuel cell stack 200 and port 310 of fuel cell stack 300 is selected so that blower 420 can be used to flow the fuel gas through system 100 without substantial liquid water build up in channels 226. Typically, in this operational state, the fuel gas pressure drop between inlet 280 and port 310 is less than about 1 pound per square inch (e.g., less than about 0.5 pounds per square inch, or less than about 0.3 pounds per square inch).

When sensor 535 detects that a relatively high power output is desired from system 100, sensor 535 sends a signal to controller 530 to open valves 500 and 520, and close valve 510. With this arrangement, the fuel gas flows through fuel cell 200 as discussed above. The fuel gas also flows from conduit outlet 410 to port 310 of fuel cell stack 300. From port 310, the fuel gas flows along manifold 302 to ports 222 of fuel cells 150 and along channels 226 of fuel cells 150 to ports 224 of fuel cell. From ports 224, the fuel gas flows along manifold 304 to port 320 of fuel cell stack 300. At the same time, fuel gas flows from outlet 290 of fuel cell stack 200 along manifold 304 to port 320 of fuel cell stack 300. Thus, in this operational state, the fuel gas flows through fuel cell stacks 200 and 300 in parallel. In this operational state, both the fuel gas pressure drop between inlet 280 of fuel cell stack 200 and port 320 of fuel cell stack 300 and the fuel gas pressure drop between port 310 of fuel cell stack 300 and port 320 of fuel cell stack 300 are selected so that blower 420 can be used to flow the fuel gas through system 100. Generally, in this operational state, these pressure drops are less than about 1 pound per square inch (e.g., less than about 0.5 pounds per square inch, or less than about 0.3 pounds per square inch).

System 100 is not limited to embodiments in which only anode flow field plates 220 are arranged so that the flow of fuel gas through stacks 200 and 300 is in parallel under certain conditions and in series under other conditions. Cathode flow field plates 210 can be similarly arranged so that the flow of oxidant gas through stacks 200 and 300 is in parallel under some conditions and in series under other conditions.

It will be appreciated that the invention is not limited by the type of partition 110 that is used. For example, a suitable partition may be formed by placing a solid sheet between stacks 200 and 300. Other partitions can be formed from a solid sheet that does not have a manifold opening. Still other configurations of partition 110 are contemplated as being embraced by the invention.

In some embodiments, it may be desirable to select the location of partition 110 to achieve a desired ratio for the number of fuel cells 150 in stack 200 to the number of fuel cells 150 in stack 300. For example, for low system output power conditions it may be desirable to run a relatively small number of fuel cells configured as a fuel cell cascade (e.g., one third of the fuel cells 150 contained in system 100 are contained in fuel cell stack 200 and two thirds of fuel cells 150 contained in system 100 are contained in fuel cell stack 300).

Figure 5:
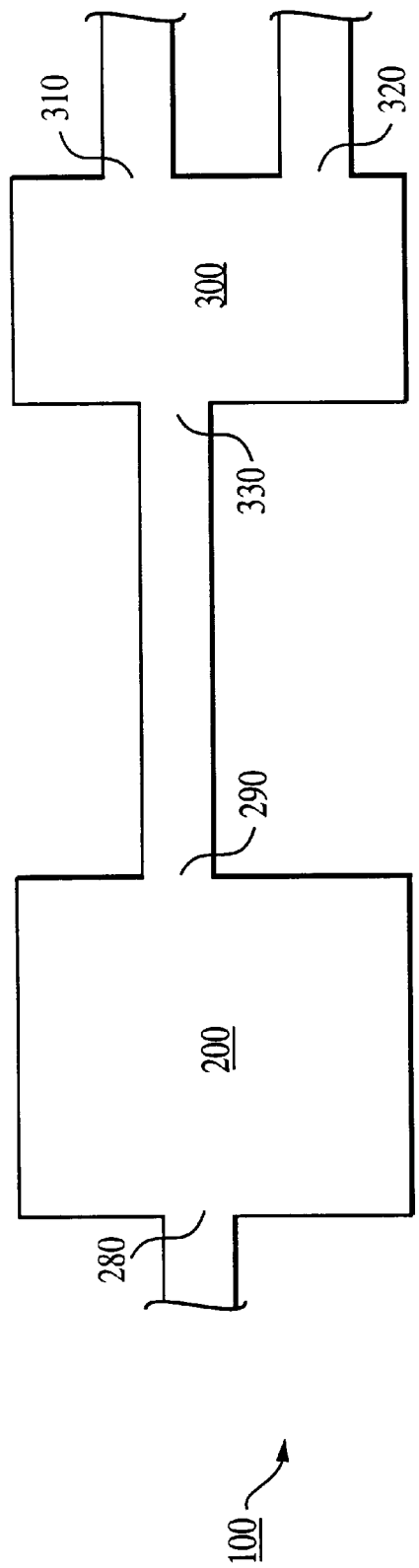
FIG. 5 is a schematic representation of a another embodiment of a fuel cell cascade flow system according to the invention.

Although system 100 has been described as having fuel cell stacks 200 and 300 adjacent each other with partition 110 disposed therebetween, the invention is not limited to such systems. For example, as shown in FIG. 5, in some embodiments system 100 may be arranged so that fuel cell stacks 200 and 300 are physically separated. These embodiments of system 100 can be arranged without the use of partition 110. It will be understood that other embodiments of system 100 can have different arrangements in which stacks 200 and 300 are physically separated.

Moreover, the invention is not limited to systems in which only two fuel cell stacks form a fuel cell cascade in one operational state and operate with parallel flow of reactant gas through the stacks in a different operational state. Rather, the system can include a plurality of fuel cell stacks arranged so that they form a fuel cell cascade in one operational state and operate with parallel flow of reactant gas in another operational state. It will be appreciated that other arrangements can be provided in which system 100 contains multiple fuel cell stacks that form a fuel cell cascade under certain operating conditions and operate with parallel flow of reactant gas under other operating conditions.

The operation of fuel cell stacks 200 and 300 is as follows. As the fuel gas flows through anode flow field plates 220 and the oxidant gas flows through cathode flow field plates 210, the molecular hydrogen and molecular oxygen contained in these gases undergo a catalyzed reaction to form electricity, water and heat. As shown in FIG. 2, in addition to anode flow field plate 220 and cathode flow field plate 210, each fuel cell 150 includes a number of other components which are designed to catalyze the reaction between molecular oxygen and molecular hydrogen. These components include a solid electrolyte 230, catalysts 240 and 250 and gas diffusion layers 260 and 270.

Electrolyte 230 is a solid polymer (e.g., a solid polymer ion exchange membrane), such as a solid polymer proton exchange membrane (e.g., a solid polymer containing sulfonic acid groups). Such membranes are commercially available from E.I. DuPont de Nemours Company (Wilmington, Del.) under the trademark NAFION. Alternatively, electrolyte 230 can also be prepared from the commercial product GORE-SELECT, available from W. L. Gore & Associates (Elkton, Md.).

Catalyst 240 is formed of a material capable of interacting with molecular hydrogen to form protons and electrons. Examples of such materials include, for example, platinum, platinum alloys, and platinum dispersed on carbon black. The catalytic material can be dispersed in one or more solvents (e.g., isopropanol) to form a suspension. The suspension is then applied to the surfaces of solid electrolyte 230 that face gas diffusion layers 260 and 270, and the suspension is then dried. Alternatively, the suspension is applied to the surfaces of gas diffusion layers 260 and 270 that solid electrolyte 230, respectively, and the suspension is then dried. The method of preparing catalyst 240 may further include the use of heat, temperature and/or pressure to achieve bonding.

Catalyst 250 is formed of a material capable of interacting with molecular oxygen, electrons and protons to form water. Examples of such materials include, for example, platinum, platinum alloys, and noble metals dispersed on carbon black. Catalyst 250 can be prepared as described above with respect to catalyst 240.

Gas diffusion layers 260 and 270 are formed of a material that is both gas and liquid permeable material so that the reactant gases (e.g., molecular hydrogen and molecular oxygen) and products (e.g., water) can pass therethrough. In addition, layers 260 and 270 should be electrically conductive so that electrons can flow from catalyst 240 to anode flow field plate 220 and from cathode flow field plate 210 to catalyst 250. Such materials are formed by infusing a porous carbon black cloth or paper with a slurry of carbon black followed by sintering with TEFLON material.

Referring to FIGS. 2 and 3, as the fuel gas flows along channels 226 of anode flow field plates 220, the molecular hydrogen contained in the fuel gas permeates gas diffusion layer 260 to interact with catalyst 240 to form protons and electrons. The protons pass through solid electrolyte 230, and the electrons pass are conducted through gas diffusion layer 260 to anode flow field plate 220, ultimately flowing through an external load to cathode flow field plate 210.

Referring to FIGS. 2 and 4, as the oxidant gas flows along channels 216 of cathode flow field plates 210, the molecular oxygen contained in the oxidant gas permeates gas diffusion layer 270 to interact with catalyst 250, electrons and protons to form water. The water can pass back through diffusion layer 270, enter the oxidant stream in channels 216, and exit fuel cell 200 through cathode flow field plate outlet 214.

Figure 6:
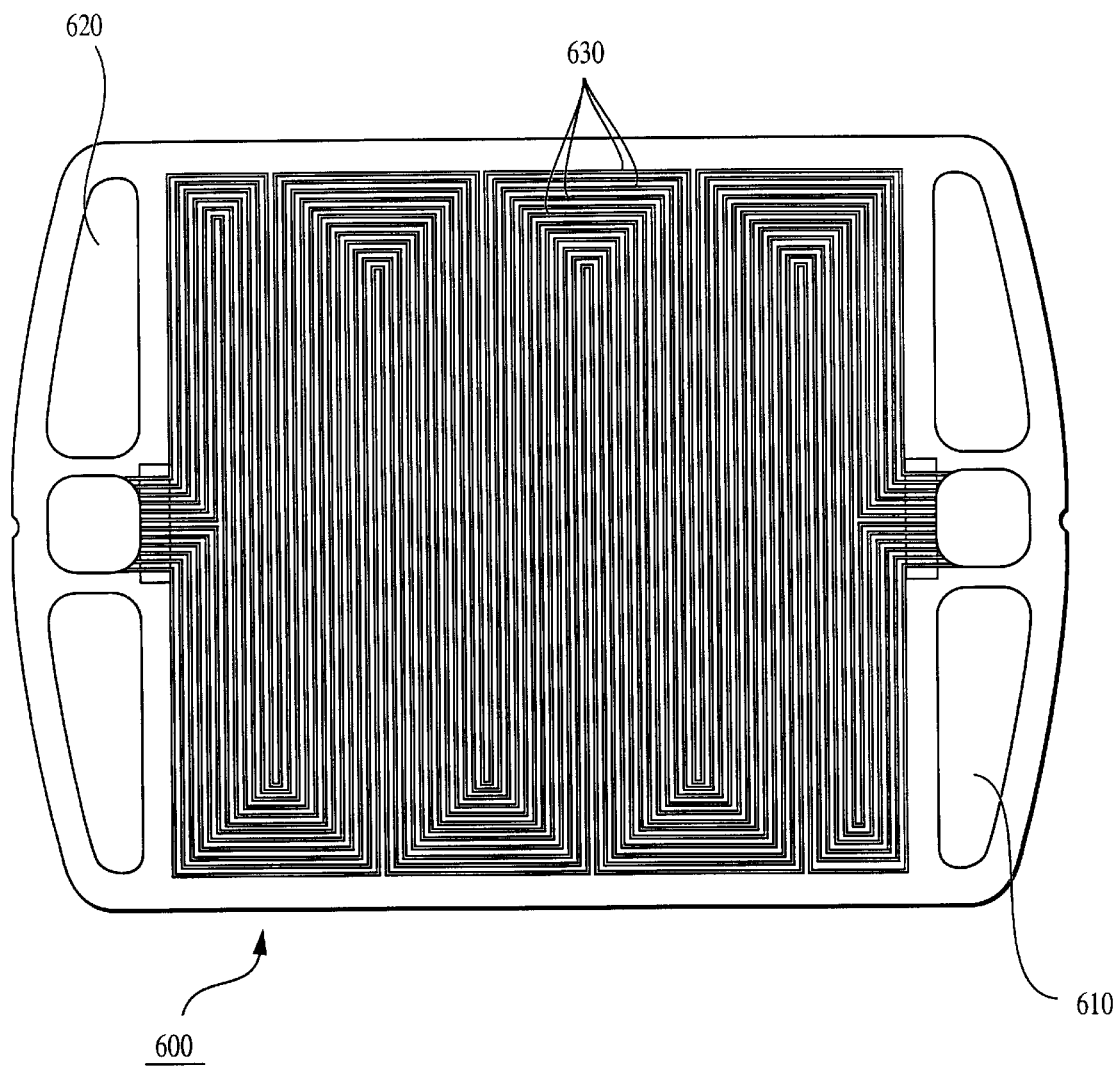
FIG. 6 is an elevational view of an embodiment of a coolant flow field plate.

The heat produced during the fuel cell reaction is removed from system 100 by flowing a coolant through the fuel cell via a coolant flow field plate. The coolant flow field plates are interspersed in system 100 between anode flow field plates 220 and cathode flow field plates 210. A coolant flow field plate can be a separate flow field plate with coolant flow paths on one or both sides of the plate, or a coolant flow field plate can be formed on the back side of anode flow field plate or a cathode flow field plate. FIG. 6 shows one side of an embodiment of coolant flow field plate 600 having an inlet 610, an outlet 620 and open-faced channels 630 that define a flow path for coolant from inlet 610 to outlet 620.

Although an illustrative embodiment of cathode flow field plate 210, anode flow field plate 220 and coolant flow field plate 600 has been described herein, other embodiments of these flow field plates can also be used. For example, another embodiment is disclosed in commonly assigned U.S. patent application Ser. No. 09/168,232, entitled "Fuel Cell Assembly Unit for Promoting Fluid Service and Design Flexibility", which is incorporated herein by reference.

While systems containing a blower (i.e., a low power device) have been described, the system is not limited to the use of a low power device to flow one or more reactant gases through the system. In some embodiments, one or more high power devices (e.g., a compressor) may be used to flow one or more reactant gases through the system. In addition, a combination of low power and high power devices may be used to flow one or more reactant gases through the system.

While certain embodiments of the invention, as well as their principals of operation, have been disclosed herein, the invention is not limited to these embodiments or these principals of operation. Other embodiments are in the claims.

What is claimed is:

1. A system, comprising:
   a first fuel cell stack having an inlet and an outlet;
   a second fuel cell stack having a first port, a second port different than the first port, and a third port different than the first and second ports, the third port being connected to the first fuel cell stack outlet along a first flow path;

a conduit that accepts a reactant gas into the system, the conduit having an outlet connected to the first fuel cell stack inlet along a second flow path different than the first flow path; and a first valve between the conduit outlet and the first port of the second fuel cell stack along a third flow path different than the first and second flow paths so that when the first valve is open the conduit outlet is connected to the first port of the second fuel cell stack along the third flow path and when the first valve is closed the conduit outlet is disconnected to the first port of the second fuel cell stack along the third flow path.

2. The system of claim 1, further comprising a second valve connected to the first port of the second fuel cell stack along a fourth flow path different than the first, second and third flow paths.

3. The system of claim 2, further comprising a controller that, during operation, sets the first valve to an open position or a closed position and sets the second valve to a position opposite the position of the first valve.

4. The system of claim 3, further comprising a third valve connected to the second port of the second fuel cell stack along a fifth flow path different than the first, second, third and fourth flow paths.

5. The system of claim 4, wherein, during operation, the controller sets the third valve to a position that is the same as the position of the first valve.

6. The system of claim 1, further comprising a second valve connected to the second port of the second fuel cell stack along a fourth flow path different than the first, second and third flow paths.

7. The system of claim 6, further comprising a controller that, during operation, sets the first valve to an open position or a closed position and sets the second valve to a position that is the same as the position of the first valve.

8. The system of claim 1, wherein the first port of the second fuel cell stack is an inlet port when the first valve is open and the first port of the second fuel cell stack is an outlet port when the first valve is closed.

9. The system of claim 1, wherein the first fuel cell stack includes a plurality of fuel cells, each fuel cell having a cathode fluid flow plate, an anode fluid flow plate and a solid electrolyte between the cathode and anode fluid flow plates, and wherein the second fuel cell stack includes a plurality of fuel cells, each fuel cell of the second fuel cell stack having a cathode fluid flow plate, an anode fluid flow plate and a solid electrolyte between the cathode and anode fluid flow plates.

10. The system of claim 9, wherein the anode flow field plate of each fuel cell in the first fuel cell stack has a flow path that connects the inlet of the first fuel cell stack to the outlet of the first fuel cell stack, and wherein the anode flow field plate of each fuel cell in the second fuel cell stack has a flow path that connects the first port of the second fuel cell stack to the second port of the second fuel cell stack.

11. The system of claim 10, wherein the cathode flow field plate of each fuel cell in the first fuel cell stack has a flow path that connects the inlet of the first fuel cell stack to the outlet of the first fuel cell stack, and wherein the cathode flow field plate of each fuel cell in the second fuel cell stack has a flow path that connects the first port of the second fuel cell stack to the second port of the second fuel cell stack.

12. The system of claim 9, wherein the cathode flow field plate of each fuel cell in the first fuel cell stack has a flow path that connects the inlet of the first fuel cell stack to the outlet of the first fuel cell stack, and wherein the cathode flow field plate of each fuel cell in the second fuel cell stack has a flow path that connects the first port of the second fuel cell stack to the second port of the second fuel cell stack.

13. The system of claim 1, wherein the first fuel cell stack is physically separated from the second fuel cell stack.

14. The system of claim 1, a number of fuel cells contained in the first fuel cell stack is at least about twice a number of fuel cells contained in the second fuel cell stack.

15. A system, comprising:
a first fuel cell stack having an inlet and an outlet;
a second fuel cell stack having a first port, a second port different than the first port, and a third port different than the first and second ports, the third port being connected to the first fuel cell stack outlet along a first flow path;
a conduit that accepts a reactant gas into the system, the conduit having an outlet connected to the first fuel cell stack inlet along a second flow path different than the first flow path; and
a switching apparatus that, during operation, controls a flow path of the reactant gas through the system, the switching apparatus having a first position and a second position,
wherein, during operation, when the switching apparatus is in the first position the reactant gas flows from the conduit outlet to the first port of the second fuel cell stack, and when the switching apparatus is in the second position the reactant gas is blocked from flowing from the conduit outlet to the first port of the second fuel cell stack.

16. The system of claim 15, wherein, during operation, when the switching apparatus is in the first position the first port of the second fuel cell stack is an inlet port and when the switching apparatus is in the second position the first port of the second fuel cell stack is an outlet port.

17. The system of claim 15, wherein the switching apparatus is disposed between the conduit outlet and the first port of the second fuel cell stack along a third flow path different than the first and second flow paths.

18. The system of claim 15, wherein the first fuel cell stack includes a plurality of fuel cells, each fuel cell having a cathode fluid flow plate, an anode fluid flow plate and a solid electrolyte between the cathode and anode fluid flow plates, and wherein the second fuel cell stack includes a plurality of fuel cells, each fuel cell of the second fuel cell stack having a cathode fluid flow plate, an anode fluid flow plate and a solid electrolyte between the cathode and anode fluid flow plates.

19. The system of claim 15, wherein the first fuel cell stack is physically separated from the second fuel cell stack.

20. The system of claim 15, a number of fuel cells contained in the first fuel cell stack is at least about twice a number of fuel cells contained in the second fuel cell stack.

21. A method of operating a system including first and second fuel cell stacks, comprising:
selecting a first reactant gas flow path through the first and second fuel cell stacks from the group consisting of a first flow path through the first and second cell stacks and a second flow path through the first and second cell stacks, the first flow path being different than the second flow path, the first flow path being selected under a first set of operating conditions and the second flow path being selected under a second set of operating conditions different than the first set of operating conditions;

flowing a first reactant gas through the first and second fuel cell stacks along the first reactant gas flow path;

flowing a second reactant gas through the first and second fuel cell stacks along a second reactant gas flow path different than the first reactant gas flow path, the second reactant gas being different than the first reactant gas; and reacting the first and second reactant gases in the first and second fuel cell stacks.

22. The method of claim 21, wherein the first reactant gas comprises a fuel gas.

23. The method of claim 21, wherein the first reactant gas comprises an oxidant gas.

24. The method of claim 21, wherein the first fuel cell stack includes a plurality of fuel cells, each fuel cell having a cathode fluid flow plate, an anode fluid flow plate and a solid electrolyte between the cathode and anode fluid flow plates, and wherein the second fuel cell stack includes a plurality of fuel cells, each fuel cell of the second fuel cell stack having a cathode fluid flow plate, an anode fluid flow plate and a solid electrolyte between the cathode and anode fluid flow plates.

25. The method of claim 21, wherein the first reactant gas flows through the first and second fuel stacks along a flow path which connects an output of the first fuel cell stack to an input of the second fuel cell stack.

26. The method of claim 21, further comprising selecting the second reactant gas flow path through the first and second fuel cell stacks from the group consisting of a third flow path through the first and second cell stacks and a fourth flow path through the first and second cell stacks, the third flow path being different than the first and second flow paths, the fourth flow path being different than the first, second and third flow paths, the third flow path being selected under the first set of operating conditions and the fourth flow path being selected under the second set of operating conditions.

* * * * *